United States Patent Office 3,410,727
Patented Nov. 12, 1968

3,410,727
FUEL CELL ELECTRODES HAVING A METAL PHTHALOCYANINE CATALYST
Raymond J. Jasinski, Sudbury, Mass., assignor to Allis Chalmers Manufacturing Company, Milwaukee, Wis.
No Drawing. Filed Jan. 8, 1965, Ser. No. 424,175
11 Claims. (Cl. 136—86)

This invention relates to those electrochemical cells known as fuel cells. More particularly, this invention relates to new and useful electrodes for use in fuel cells. In particular, this invention concerns novel fuel cell electrodes having a catalyst thereupon comprising metal chelates of phthalocyanine and phthalocyanine derivatives.

The term fuel cell, as used herein, refers to those electrochemical devices that convert the free energy of a chemical reaction directly to electrical energy. Such devices are well known in the art and although there are differences between various cells, a discussion of some of their common characteristics will aid in the understanding of my invention.

As is known, oxidation-reduction reactions are accompanied by the transfer of electrons from the reductant to the oxidant. In individual fuel cells, the oxidation reaction and the reduction reaction take place at spacially separated electrodes. At each electrode there occurs what is called a half-cell reaction. A reactant referred to as the fuel that is oxidizable with respect to some oxidant is supplied by suitable means to the anode, and is thereat electrochemically oxidized. Oxidation of the fuel releases electrons to the anode. At the other electrode, called the cathode, spaced apart from the anode by a suitable electrolyte, the other half-cell reaction simultaneously takes place. A reactant called the oxidant, reducible with respect to the fuel, is supplied by suitable means to the cathode, and is thereat electrochemically reduced. This reaction takes up electrons from the cathode.

These two half-cell reactions result in the cathode tending to have a deficiency of electrons and the anode to have an excess. This tendency is relieved by the transfer of charge electronically through an external circuit connecting the electrodes, accompanied by the ionic transfer of charge through electrolyte. The current produced in the external circuit can do useful work. Production of current will continue so long as fuel and oxidant are supplied and waste products exhausted.

The voltage of the individual fuel cell is limited by the theoretical free energy change $\Delta F$) for the reaution at the fuel cell operating temperature. The amperage of the cell is determined by the rate of reaction and the size of the cell. In practice, several individual fuel cells are coupled in cooperative electrical connection to obtain the desired output. A plurality of cells so connected is known as a module.

Although the reaction between oxidant and fuel is thermodynamically spontaneous, the respective reactants must attain an activiated state before they can react. The energy input required to reach an activated state, i.e. heat of activation, partly determines the speed of reaction. The greater the energy that is required for activation, the fewer are the molecules of reactant possessing this energy at a given temperature, and consequently the slower is the reaction.

In the past, to speed reaction, an external heat source was used to heat fuel cell reactants and thereby activate them. More recently, catalysts have been employed to increase reaction rate. Through a mechanistic bypass, a catalyst brings about reaction with a smaller heat of activation. Catalysts have made possible the operation of so called low temperature fuel cells (from about 25° C. to about 300° C.) without a lessening in cell output compared to cells operating at higher temperature. It follows that with more efficient catalysts, the activation can be decreased and greater cell outputs attained at a given voltage and temperature.

The catalytic activation of oxygen, air and the like has been accomplished in fuel cells by the use of catalysts including Au, Ag, Pt, Pd, and oxides of certain transition metals. So far as known however, never has an organic metal chelate been used as a fuel cell catalyst. I have discovered that the metal chelates of the phthalocyanines have a distinct catalytic activity toward certain reactants at a fuel cell cathode. The catalysts of my invention, when incorporated upon an electrode carrier base, are suitable for activation of oxidants in which oxygen is reducible species, including air and hydrogen peroxide, together with other peroxygen compounds.

Accordingly the general object of my invention is to provide a catalyst activated cathode for fuel cells that does not carry a precious metal catalyst, but yet still attains significant electrical outputs.

A further object of my invention is to provide a fuel cell cathode bearing a catalyst that is stable, and is inert to destructive deterioration from either the fuel cell reactants or the electrolyte.

A still further object of my invention is to provide a catalyst for fuel cell cathode that is economically advantageous to use compared to known catalysts, especially the Group VIII metals.

The phthalocyanine metal chelates are known compounds and are described by R. Linstead in J. Chem. Soc. 137 1016 (1934). Phthalocyanine itself has four isoindole groups united by four nitrogen atoms to form a conjugated chain. The metal chelates of phthalocyanine in which the metal is held by secondary valences of the isoindole nitrogen atoms $(C_6H_4C_2N)_4N_4Me$, include compounds wherein Me represents a metal of the transition series and especially Mn, V, Co, Ni, Cu, and Pt. Another group of compounds are the chloro substituted derivatives of these phthalocyanine transition metal chelates in which up to 16 hydrogen atoms in the molecule are replaced by chlorine. These transition metal chelates of phthalocyanine and their chloro substituted derivatives I have found to have a catalytic activity toward cathode reactants in fuel cells.

Within the fuel cell art generally and especially within this specification the term electrode refers to the electrically conductive base support structure carrying an application of catalyst that is operative to serve as a site for electrochemical reaction. The term plaque refers to the conductive base support structure minus the application of catalyst; and plaque material refers to that substance of which the plaque is to be fabricated.

Since fuel cell electrodes function dually as a site for electrochemical reaction and an electrical current conductor, the base material or plaque must be electrically conductive and preferably porous to better receive and hold the catalytic material. Suitable plaques are made from nickel, carbon and tantalum depending on the pH of the electrolyte. Other materials, provided they can perform the previously referred to dual functions are entirely satisfactory provided that they are inert to destructive chemical action by the fuel cell electrolyte reactants or products.

If the cathode reactant is a gas, the electrode can further be treated to render it resistant to electrolyte flooding and gas blow out. This treatment generally takes the form of pore size control or partially wetproofing the electrode. These auxiliary characteristics of the electrode including size, shape, and reactant feeding means are well known in the art, and are apart from my discovery of the catalytic activity of metal phthalocyanines and derivatives toward reactants at fuel cell cathdes.

The catalyst can be applied by a number of practical methods. For example the metal phthalocyanine can be dissolved, or partially dissolved in a solvent. A plaque is immersed in the phthalocyanine solution or slurry as the case may be. After the plaque is saturated, it is removed and the solvent evaporated.

Another approach is to reversibly oxidize the metal phthalocyanine to a more soluble form. This technique for solubilizing metal phthalocyanines is described in an article appearing in J. Org. Chem. 22 127, (1957), by C. Pedersen. A plaque is immersed into and saturated with the oxidized phthalocyanine compound. The saturated plaque is then treated with a reducing agent so as to reform the phthalocyanine compound upon and within the pores of the plaque.

Still another approach particularly useful for the chloro derivatives of phthalocyanine chelates is to synthesize the phthalocyanine chelate directly on the plaque. Other methods of applying the catalyst to the plaque will be apparent to one skilled in the art.

The electrode and method of making the same that I find most satisfactory and preferably shall now be set forth. An especially satisfactory electrode for fuel cells having an aqueous alkali hydroxide electrolyte is made from an admixture of from 80 to 90% by weight plaque material, 9 to 17% by weight of a catalyst comprising a transition metal chelate selected from the group consisting of the copper, nickel, manganese, vanadium, cobalt and platinum chelates of phthalocyanine and chlorophthalocyanine, and 1 to 3% by weight thermoplastic binder. In producing the electrode the plaque material in a finely divided form, for example carbonyl nickel powder, is thoroughly blended with the catalyst. A solvent is then added so as to cause the catalyst to flow about the plaque material. Pyridine has been found the most suitable solvent to act as a flux even though it may not completely dissolve all the catalytic material. Although phthalocyanine compounds are only partially soluble in pyridine, this solubility is sufficient to insure that some coating action occurs between the phthalocyanine chelate and the particles of nickel powder.

When the plaque material has been coated, the solvent is evaporated. Then an aqueous dispersion of a thermoplastic resin, e.g. polytetrafluoroethylene is added in sufficient quantity to bind the substrate powder and catalyst into a cohesive mass. When using polytetrafluoroethylene as a binder, one may tell that sufficient polytetrafluoroethylene is present when instead of breaking into discrete particles the mixture of nickel powder, phthalocyanine metal chelate, and polytetrafluoroethylene remains in a taffylike consistency and the water from the Teflon dispersion separates out. The water is separated from the solids and the dispersion mixture of nickel powder, catalyst, and binder is dried. After drying, the mixture is spread upon a support screen. This support screen necessarily has the same characteristics of electrical conductivity and chemical inertness as the plaque material, and preferably is constructed from the plaque material. Suitable support screens are constructed from nickel having a 100 to 150 Tyler mesh.

The screen now carrying the mixture of nickel powder, catalyst and binder is placed within a suitable mold and is pressed into the desired electrode shape that will maintain good contact with the screen. The electrode is then heated in an oven of from 100 to 150° C. to slightly plasticize the Teflon and to insure good bonding of plaque material and the catalyst to each other and to the support screen.

The following specific examples, together with the accompanying data will further serve to add to one's understanding of the utility and merit of my invention.

EXAMPLE 1

In a test cell, a platinum on nickel strip was used as a counter electrode, also referred to as the dummy anode. A salt bridge-Luggin capillary connected the dummy anode to a saturated calomel reference electrode. The electrolyte was aqueous potassium hydroxide, 25% KOH by weight.

The cathode was prepared in the following manner. Cobalt phthalocyanine was mixed with a nickel carbonyl powder in the ratio of 1 to 10 and pressed into the bore of a stainless steel tube thus forming a catalytic plug within the tube. The tube served both as the oxidant supply means and the electrical connection. The die for pressing the plug was so constructed that the base of the plug was formed into a cone of approximately ½ square centimeter geometrical area. This design prevented the accumulation of large gas pockets beneath the plug. Such gas pockets if present would electrically isolate the catalyst from the electrolyte.

Oxygen was used as the oxidant and was brought to the catalyst plug at a sufficient pressure to produce gas bubbles at the plug electrolyte interspace. The cell was driven with a commutator. Cathode half-cell voltage measurements versus the reference electrode were made with a vacuum tube voltmeter and are tabulated in Table I. Here appears Table I:

| Current density (amp./sq. ft.) | Half-cell voltage (vs. SCE) | |
|---|---|---|
| | Ni powder blank (v.) | CoPc (v.) |
| 0 | −0.20 | −0.20 |
| 18 | −0.35 | −0.33 |
| 36 | −0.53 | −0.43 |
| 92 | −0.63 | −0.50 |
| 108 | −0.78 | −0.57 |

EXAMPLE 2

The electrode of Example 1 was subjected to a life test. The experimental arrangement was similar to that described in Example 1, except that constant current circuit formed from two batteries in series with a variable resistor was used to drive the cell. The results are tabulated in Table II:

| Time (h.) | Cathode voltage (v.) (vs. SCE) | Current density (amp./sq. ft.) |
|---|---|---|
| 0 | −0.33 | 18 |
| 14 | −0.33 | 18 |
| 20 | −0.40 | 36 |
| 25 | −0.47 | 54 |
| 51 | −0.49 | 54 |
| 95 | −0.56 | 54 |
| 96 | −0.37 | 36 |
| 148 | −0.41 | 36 |
| 245 | −0.40 | 36 |
| 246 | −0.49 | 54 |
| 269 | −0.48 | 54 |
| 435 | −0.47 | 54 |
| 461 | −0.45 | 54 |
| 519 | −0.45 | 54 |
| 591 | −0.44 | 54 |
| 615 | −0.45 | 54 |

EXAMPLE 3

A 3″ x 3″ nickel plaque was impregnated with cobalt phthalocyanine. The cathode was prepared by immersing a sintered nickel plaque into a cobalt phthalocyanine pyridine slurry until the plaque became saturated and then drying it in air. The remaining cobalt phthalocyanine-pyridine slurry was slowly poured onto the plaque allowing the pyridine to evaporate. The cathode was then dried in air at 120° C. A total of 0.123 gram of cobalt phthalocyanine was applied to the plaque in this manner. This cathode was installed in a hydrogen-oxygen test cell having a Pt-Pd catalyzed anode, and an aqueous 25% by weight KOH electrolyte. The cell was operated at 70°–80° C. The half-cell data obtained with this cathode is shown in Table III:

| Current density (amp./sq. ft.) | Half-cell voltage (v.) (vs. SCE) |
|---|---|
| 0 | −0.21 |
| 1 | −0.28 |
| 10 | −0.38 |
| 20 | −0.42 |
| 100 | −0.48 |
| 110 | −0.50 |

EXAMPLE 4

A cathode was prepared by admixing nickel carbonyl powder, cobalt phthalocyanine and polytetrafluoroethylene in the manner described earlier in this specification. This cathode was installed in a fuel-cell arrangement as described in Example 3, and the experimental results are tabulated in Table IV. Two series of tests were run. The first had about 17% cobalt phthalocyanine catalyst, and the second about 9%, the remainder in each case being carbonyl powder and resin binder. The results are shown in Table IV:

| Current, amps (I) | Current Density, a.s.f. (I×20) | Cathode Pot. (vs. SCE),[1] v. | | Cell Pot., v. | |
|---|---|---|---|---|---|
| | | Ni | CoPc-Ni(1:5) | Ni | CoPc-Ni(1:5) |
| 2.0 | 40 | 0.46 | 0.39 | 0.78 | 0.80 |
| 4.0 | 80 | 0.50 | 0.42 | 0.73 | 0.75 |
| 6.0 | 120 | 0.53 | 0.43 | 0.70 | 0.73 |
| 8.0 | 160 | 0.56 | 0.44 | 0.62 | 0.70 |
| 10.0 | 200 | 0.62 | 0.45 | 0.52 | 0.66 |
| I | (I×20) | Ni | CoPc-Ni(1:10) | Ni | CoPc-Ni(1:10) |
| 2.0 | 40 | 0.46 | 0.42 | 0.78 | 0.78 |
| 4.0 | 80 | 0.50 | 0.44 | 0.73 | 0.74 |
| 6.0 | 120 | 0.53 | 0.45 | 0.70 | 0.70 |
| 8.0 | 160 | 0.56 | 0.45 | 0.62 | 0.61 |
| 10.0 | 200 | 0.62 | 0.46 | 0.52 | 0.51 |

[1] IR free.

The embodiments of the invention in which an exclusive property or privilege is claimed are defined as follows:

1. In a fuel cell having a housing; an anode electrode and a cathode electrode mounted in said housing; in spaced apart relation to each other; an electrolyte containment means disposed between said electrodes; means for supplying a fuel to said anode; means for supplying an oxidant to said cathode; and the improvement in said cell being that said cathode comprises an electrically conductive porous support having randomly dispersed thereover and in the pores thereof a metal chelate selected from the group consisting of the copper, nickel, cobalt, manganese, vanadium and platinum chelates of phthalocyanine and chlorophthalocyanine.

2. A fuel cell according to claim 1 in which said oxidant is selected from the group consisting of oxygen, air, and peroxygen compounds.

3. A fuel cell according to claim 1 in which said metal chelate is cobalt phthalocyanine.

4. A fuel cell according to claim 1 in which said metal chelate is cobalt chlorophthalocyanine.

5. A fuel cell having a housing; an anode electrode and a cathode electrode mounted in said housing in spaced apart relation to each other; an electrolyte disposed between said electrodes; means for supplying a fuel to said anode; means for supplying an oxidant to said cathode; said cathode comprising a porous plaque having a catalyst disposed thereon, said catalyst comprising a metal chelate selected from the group consisting of the copper, nickel, cobalt, manganese, vanadium and platinum chelates of phthalocyanine and chlorophthalocyanine.

6. A fuel cell according to claim 5 in which said electrolyte is a aqueous alkali hydroxide.

7. A fuel cell according to claim 6 in which said metal chelate is cobalt phthalocyanine.

8. A fuel cell according to claim 6 in which said metal chelate is cobalt chlorophthalocyanine.

9. A fuel cell according to claim 6 in which said oxidant is selected from the group consisting of air, oxygen, and peroxygen compounds.

10. A fuel cell having a housing; an anode electrode and a cathode electrode mounted in said housing in spaced relation to each other; an aqueous alkali hydroxide electrolyte disposed between said electrodes; means for supplying a fuel to said anode; means for supplying an oxidant selected from the group consisting of air, oxygen and peroxygen compounds to said cathode; said cathode comprising a porous nickel plaque; a catalyst disposed upon and within said plaque; said catalyst comprising cobalt phthalocyanine.

11. A fuel cell having a housing; an anode electrode and a cathode electrode mounted in said housing in spaced relation to each other; an electrolyte disposed between said electrodes; means for supplying an oxidant to said cathode and means for suplying a fuel to said anode; said cathode comprising an electrically conductive porous support having randomly dispersed thereover and in the pores thereof a phthalocyanine of the formula $$(C_6X_4C_2N)_4N_4Me$$

wherein Me represents a metal of the transition series and X represents hydrogen and chlorine.

References Cited

UNITED STATES PATENTS

| 3,230,180 | 1/1966 | Larson | 252—431 |
| 3,140,292 | 7/1964 | Urban | 260—314.5 |
| 3,108,081 | 10/1963 | Gleim et al. | 252—428 |
| 2,882,224 | 4/1959 | Gleim et al. | 260—314.5 |

WINSTON A. DOUGLAS, Primary Examiner.

M. ANDREWS, Assistant Examiner.